United States Patent
Nelson

(10) Patent No.: US 9,951,261 B2
(45) Date of Patent: Apr. 24, 2018

(54) CEMENT SPACER SYSTEM FOR WELLBORES, METHODS OF MAKING, AND METHODS OF USE

(71) Applicant: Scott Gregory Nelson, Cypress, TX (US)

(72) Inventor: Scott Gregory Nelson, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 87 days.

(21) Appl. No.: 14/643,117

(22) Filed: Mar. 10, 2015

(65) Prior Publication Data

US 2016/0264838 A1    Sep. 15, 2016

(51) Int. Cl.
| C09K 8/42 | (2006.01) |
| E21B 33/13 | (2006.01) |
| C04B 28/02 | (2006.01) |
| C09K 8/40 | (2006.01) |
| C09K 8/467 | (2006.01) |
| C04B 103/00 | (2006.01) |

(52) U.S. Cl.
CPC ............. *C09K 8/424* (2013.01); *C04B 28/02* (2013.01); *C09K 8/40* (2013.01); *C09K 8/467* (2013.01); *C04B 2103/0043* (2013.01)

(58) Field of Classification Search
None
See application file for complete search history.

(56) References Cited

U.S. PATENT DOCUMENTS

| 2,854,407 | A | 9/1958 | Mallory |
| 3,820,602 | A | 6/1974 | Motley et al. |
| 3,850,248 | A | 11/1974 | Carney |
| 5,101,902 | A | 4/1992 | Philippe et al. |
| 5,866,517 | A | 2/1999 | Carpenter et al. |
| 6,059,034 | A | 5/2000 | Rickards et al. |
| 6,330,916 | B1 | 12/2001 | Rickards et al. |
| 6,364,018 | B1 | 4/2002 | Brannon et al. |
| 7,426,961 | B2 | 9/2008 | Stephenson et al. |
| 9,650,559 | B2 * | 5/2017 | Nelson .................... C09K 8/40 |
| 2001/0002224 | A1 | 5/2001 | Sasaki et al. |
| 2005/0230116 | A1 | 10/2005 | Eoff et al. |
| 2006/0185848 | A1 | 8/2006 | Surjaatmadja et al. |
| 2006/0213662 | A1 | 9/2006 | Creel et al. |
| 2007/0068675 | A1 | 3/2007 | Barry et al. |
| 2009/0095475 | A1 | 4/2009 | Ravi et al. |
| 2010/0204069 | A1 | 8/2010 | Le et al. |
| 2011/0094746 | A1 | 4/2011 | Allison et al. |
| 2011/0303415 | A1 | 12/2011 | Todd et al. |
| 2012/0103610 | A1 | 5/2012 | Turner et al. |
| 2012/0305250 | A1 | 12/2012 | Burts et al. |
| 2013/0000900 | A1 * | 1/2013 | Kalgaonkar ........... C09K 8/035 166/279 |
| 2013/0341025 | A1 | 12/2013 | Gupta |
| 2014/0024561 | A1 * | 1/2014 | Reddy ..................... C08J 3/245 507/117 |
| 2014/0332213 | A1 | 11/2014 | Zhou et al. |
| 2016/0026483 | A1 | 9/2016 | Nelson |

FOREIGN PATENT DOCUMENTS

| WO | 2007082207 | | 7/2007 |
| WO | 2010027366 | A1 | 3/2010 |
| WO | 2010094932 | A1 | 8/2010 |
| WO | 2012162117 | | 11/2012 |
| WO | 2014004611 | A2 | 1/2014 |

OTHER PUBLICATIONS

Hannah, R.R. et al., "The Real-Time Calculation of Accurate Bottomhole Fracturing Pressure From Surface Measurements Using Measured Pressures as a Base", SPE 12062 (1983); 12 pages.
Jacot, et al., "Technology Integration—A Methodology to Enhance Production and Maximize Economics in Horizontal Marcellus Shale Wells", SPE 135262 (2010); 28 pages.
Yeager et al., "Injection/Fall-off Testing in the Marcellus Shale: Using Reservoir Knowledge to Improve Operational Efficiency", SPE 139067 (2010); 19 pages.
Bishop, et al., "A Robust, Field Friendly, Cement Spacer System" Drilling Specialties Company, ConocoPhillips Company; AADE Fluids Conference and Exhibition held in Houston, TX, Apr. 8-9, 2008; 5 pages.
International Search Report, International Application No. PCT/US2016/020431, dated Jun. 21, 2016, Korean Intellectual Property Office; International Search Report 4 pages.
Written Opinion, International Application No. PCT/US2016/020431, dated Jun. 21, 2016, Korean Intellectual Property Office; Written Opinion 5 pages.

* cited by examiner

*Primary Examiner* — John J Figueroa
(74) *Attorney, Agent, or Firm* — Cantor Colburn LLP

(57) ABSTRACT

A cement spacer fluid for use in a wellbore includes an aqueous cement spacer carrier fluid and a preformed synthetic polymer swellable in the aqueous cement spacer carrier fluid in an amount effective to displace a drilling fluid during a cementing operation. Preferably, the polymer is particulate, and forms a hydrated pack of particles. A method of cementing a wellbore comprising a drilling fluid includes injecting the cement spacer fluid into the wellbore to displace the drilling fluid; injecting a cement slurry into the wellbore subsequent to injecting the cement spacer fluid; and hardening the cement in the slurry to cement the wellbore.

16 Claims, No Drawings

CEMENT SPACER SYSTEM FOR WELLBORES, METHODS OF MAKING, AND METHODS OF USE

BACKGROUND

This disclosure relates to cement spacer fluids for use in wellbores, methods for their manufacture, and methods of use.

Drilling fluids (or "muds") used in the drilling of subterranean oil and gas wells and other drilling applications are well known. Drilling fluids carry cuttings and other particulates from beneath the bit, transport them through the annulus, and allow their separation at the surface while at the same time the rotary bit is cooled and cleaned. A drilling fluid is also intended to reduce friction between the drill string and the sides of the hole while maintaining the stability of uncased sections of the borehole. The drilling fluid is formulated to prevent unwanted influxes of formation fluids from permeable rocks penetrated. The drilling fluid may also be used to collect and interpret information available from drill cuttings, cores and electrical logs. It will be appreciated that as used herein, the term "drilling fluid" also encompasses "drill-in fluids" and "completion fluids".

A spacer fluid, in contrast, is a liquid used to physically separate one special-purpose liquid from another during a drilling operation. A cement spacer fluid separates drilling fluid from cement during cementing operations in a well bore. Prior art cement spacer fluids are designed to be turbulent spacer fluids at low shear rates allowing them to displace viscous drilling mud from the wellbore. Some turbulent spacer fluids have certain drawbacks, for example, instability under operating conditions, especially at the higher temperatures as they can exist at the bottom of a wellbore. Others can allow mixing and remixing of the fluids they are designed to separate. In the case of separating drilling fluids from cement, such mixing and remixing results in reduced segregation performance, drilling mud contamination to the leading edge of the cement or cement slurry, limited capability to move drilling muds in the wellbore, low sweep efficiencies of water-based muds. Usually these disadvantages adversely affect the quality of the cementing operation in the drill hole, for example, by failing to adequately remove the drilling fluid the performance of the set cement slurry may be compromised with respect to its ability to bond to both the exposed rock surface in the drilled wellbore and to the tubulars placed in the wellbore.

Accordingly, there remains a need in the art for improved spacer fluids that overcome aforementioned drawbacks. In particular, a need remains for a cement spacer fluid that can effectively remove particulate such as drilling muds, as well as liquid contaminant particles.

BRIEF DESCRIPTION

A cement spacer fluid for use in a wellbore includes an aqueous cement spacer carrier fluid and a preformed synthetic polymer swellable in the aqueous cement spacer carrier fluid in an amount effective to displace a drilling fluid during a cementing operation. Preferably the polymer is particulate, and forms a hydrated pack of particles.

A method of cementing a wellbore comprising a drilling fluid includes injecting the cement spacer fluid herein into the wellbore to displace the drilling fluid; injecting a cement slurry into the wellbore subsequent to injecting the cement spacer fluid; and hardening the cement in the slurry to cement the wellbore.

DETAILED DESCRIPTION

A detailed description of one or more embodiments is presented herein by way of exemplification and not limitation.

An improved method for cementing a well uses a cement spacer fluid comprising a water-swellable, preformed synthetic polymer stable at high temperatures. In an advantageous feature, the cement spacer fluid can efficiently displace contaminant particulates as well as liquids. Without being bound by theory, it is believed that the preformed synthetic polymer utilizes a novel particle packing mode approach to create a cementing spacer system that does not follow the conventional rules within the art of cementing. Absorption of water causes the preformed synthetic polymer to swell, and in some embodiments, agglomerate to a hydrated pack of swelled polymer. The swelled polymer aids suspension of contaminant particulate in the cement spacer fluid. Thus, in addition to carrying, transporting and moving solids derived from drilling fluids, the cement spacer fluids can also remove drill cuttings, for example drill cuttings from the cuttings bed at the bottom of horizontal (lateral) wellbores. This capability is especially important in horizontal wellbores. It has further been discovered by the inventor hereof that use of the preformed synthetic polymer in the cement spacer fluid provides improved stability of the system.

The cement spacer fluid comprises a cement spacer carrier fluid and the preformed synthetic polymer. The polymer can be present in the carrier fluid in any form, including particulate. In an embodiment, the polymer particles are swelled polymer particles. Swelling of the polymer particles can be the result of water absorption by the polymer particles. Swelled polymer particles can agglomerate to a hydrated pack including swelled polymer particles. In an embodiment, the cement spacer fluid comprises a cement spacer carrier fluid and a hydrated pack of swelled polymer particles comprising the preformed synthetic polymer.

The shape of the polymer particles before addition to the carrier fluid, or after swelling is not critical, and can be regular or irregular, for example spherical, ovoid, polyhedral, or fibrous, stranded, or braided. In an embodiment, the polymer particles are in the form of beads having an approximately spherical shape. The particles can further have pores or spaces between the polymer chains that admits entrance of a fluid or other particles therein. The shape, size, size distribution, and concentration of the polymer particles in the carrier fluid should be effective to provide efficient displacement of the drilling fluids, and are preferably selected to improve suspension of contaminant particulates in the cement spacer fluid. For example, unswelled particles can have an average largest diameter of about 150 to about 1,000 micrometers, preferably about 250 to about 800 micrometers. The unswelled polymer particles (e.g. dry particles) are in general swellable. Swelling leads to an increase in average largest diameter of the particles. This particle swellability can be about 1 to about 20 times, or about 1 to about 15 times, about 1.5 to about 10 times, based on average largest diameter of a swelled polymer particle relative to average largest diameter of the same particle without swelling. In a non-limiting example, a dry polymer particle having an average largest diameter of about 200 micrometer can swell to a swelled polymer particle with an average largest diameter of about 2,000 micrometers.

In some embodiments, at least about 60%, preferably at least about 80%, more preferably at least about 95% of the swelled polymer particles in the cement spacer fluid can have an average largest diameter of about 0.01 to about 100,000 micrometers, preferably about 0.1 to about 50,000 micrometers, or about 1 to about 20,000 micrometers more preferably about 100 to about 50,000 micrometers, about 500 to about 12,000 micrometers, or about 2,000 to about 8,000 micrometers. In other embodiments, at least about 95% of the polymer particles in the cement spacer fluid can have an average largest diameter of about 100 to about 15,000 micrometers, more preferably about 500 to about 12,000 micrometers. At least about 90% of the polymer particles can have an average largest diameter of about 1 to about 20,000 micrometers, preferably about 100 to about 15,000 micrometers, more preferably about 500 to about 10,000 micrometers. At least about 75% of the polymer particles can have an average largest diameter of about 100 to about 15,000 micrometers, preferably about 500 to about 12,000 micrometers, preferably about 1,000 to about 10,000 micrometers. At least about 50% of the polymer particles can have an average largest diameter of about 500 to about 12,000 micrometers, preferably about 1,000 to about 10,000 micrometers, preferably about 2,000 to about 8,000 micrometers. At least about 30% of the polymer particles can have an average largest diameter of about 1,000 to about 10,000 micrometers, preferably about 2,000 to about 8,000 micrometers, more preferably about 2,500 to about 7,000 micrometers.

The preformed synthetic polymer can be a superabsorbent polymer (SAP), which as used herein is a crosslinked, neutral, neutralized or partially neutralized polymer that is capable of absorbing large amounts of aqueous liquids, such as water, brine, acid, or base, with swelling and the formation of a gel or viscous material, and that retains the absorbed fluid under a certain pressure or temperature. The superabsorbent polymer can have internal crosslinks, surface crosslinks, or a combination comprising at least one of the foregoing. Superabsorbent polymer particles are particles of superabsorbent polymers or superabsorbent polymer compositions. The acronym SAP may be used in place of superabsorbent polymer, superabsorbent polymer composition, and particles or fibers (and the like) herein.

The SAP comprises a hydrophilic network that retains large amounts of aqueous liquid relative to the weight of the SAP (e.g., in a dry state, the SAP absorbs and retains a weight amount of water equal to or greater than its own weight). The SAPs can be a variety of synthetic organic polymers that react with or absorb water and swell when contacted with an aqueous fluid. Non-limiting examples of such SAPs are poly(hydroxyC$_{1-8}$ alkyl (meth)acrylate)s such as (2-hydroxyethyl acrylate), poly(meth)acrylamide, poly(vinyl pyrrolidine), poly(vinyl acetate), and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The preformed synthetic polymers are polymerized from nonionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, C$_{1-8}$ alkyl (meth)acrylates, hydroxyC$_{1-8}$ alkyl (meth)acrylates such as hydroxyethyl (meth)acrylate, N-vinylformamide, N-vinylacetamide, and (meth)acrylonitrile. As used herein, "poly((meth)acrylamide)s" includes polymer comprising units derived from (meth)acrylamide, alkyl-substituted (meth)acrylamides such as N—C$_{1-8}$ alkyl (meth)acrylamides and N,N-di(C$_{1-8}$ alkyl) (meth)acrylamides, aminoalkyl-substituted (meth)acrylamides such as N,N-di(amino(C$_{1-8}$ alkyl))-substituted (meth)acrylamides, and (N,N-dialkylamino) alkyl-substituted (meth)acrylamides such as (N,N-di(C$_{1-8}$ alkyl)amino)(C$_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing can be used. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically-unsaturated anionic monomers having acidic groups, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, or a combination comprising at least one of the foregoing can be used.

Examples of cationic monomers include (N,N-di(C$_{1-8}$alkylamino)(C$_{1-8}$alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di(C$_{1-8}$alkyl)amino)C$_{1-8}$alkyl acrylamide, and the quaternary forms thereof such as acrylamidopropyl trimethyl ammonium chloride.

In an embodiment, the preformed synthetic polymer is amphoteric, containing both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

The preformed synthetic polymer can include a plurality of crosslinks among the polymer chains of the polymer. The crosslinks can be covalent and result from crosslinking the polymer chains using a crosslinker. The crosslinker can be an ethylenically-unsaturated monomer that contains, for example, two sites of ethylenic unsaturation (i.e., two ethylenically unsaturated double bonds), an ethylenically unsaturated double bond and a functional group that is reactive toward a functional group (e.g., an amide group) of the polymer chains of the polymer, or several functional groups that are reactive toward functional groups of the polymer chains of the polymer. The degree of crosslinking can be selected so as to control the amount of swelling of the polymer. For example, the degree of crosslinking can be used to control the amount of fluid absorption or the volume expansion of the polymer.

Exemplary crosslinkers include a diacrylamide or methacrylamide of a diamine such as a diacrylamide of piperazine; an acrylate or methacrylate ester of a di, tri, tetrahydroxy compound including ethyleneglycol diacrylate, polyethyleneglycol diacrylate, trimethylopropane trimethacrylate, ethoxylated trimethylol triacrylate, ethoxylated pentaerythritol tetracrylate, and the like; a divinyl or diallyl compound separated by an azo group such as a diallylamide of 2,2'-azobis(isobutyric acid) or a vinyl or allyl ester of a di or tri functional acid. Additional crosslinkers include water-soluble diacrylates such as poly(ethylene glycol) diacrylate (e.g., PEG 200 diacrylate) or PEG 400 diacrylate and polyfunctional vinyl derivatives of a polyalcohol such as ethoxylated (9-20) trimethylol triacrylate. Further examples of the crosslinker include aliphatic unsaturated amides, such as methylenebisacrylamide or ethylenebisacrylamide; aliphatic esters of polyols or alkoxylated polyols with ethylenically unsaturated acids, such as di(meth)acrylates or tri(meth)acrylates of butanediol, ethylene glycol, polyglycols, trimethylolpropane; di- and triacrylate esters of trimethylolpropane (which is oxyalkylated (such as ethoxylated) with an alkylene oxide such ethylene oxide); acrylate and methacrylate esters of glycerol or pentaerythritol; acrylate and methacrylate esters of glycerol and pentaerythritol oxyethylated with, e.g., ethylene oxide; allyl compounds (such as allyl(meth)acrylate, alkoxylated allyl(meth)acrylate reacted with, e.g., ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid); or monomers that are capable of crosslinking, such as N-methylol compounds of unsaturated amides, such as of methacrylamide or acrylamide, and the ethers derived therefrom. A combination of the crosslinkers also can be employed.

When the preformed synthetic polymer is in the form of a particle, the particle can includes surface crosslink external to the interior of the particle. The surface crosslinks can result from addition of a surface crosslinker to the superabsorbent polymer particle and subsequent heat treatment. The surface crosslinks can increase the crosslink density of the particle near its surface with respect to the crosslink density of the interior of the particle. Surface crosslinkers can also provide the particle with a chemical property that the superabsorbent polymer did not have before surface crosslinking, and can control the chemical properties of the particle, for example, hydrophobicity, hydrophilicity, and adhesiveness of the superabsorbent polymer to other materials, for example, minerals (e.g., silicates) or other chemicals, for example, petroleum compounds (e.g., hydrocarbons, asphaltene, and the like).

Surface crosslinkers have at least two functional groups that are reactive with a group of the polymer chains, for example, any of the above crosslinkers, or crosslinkers having reactive functional groups such as an acid (including carboxylic, sulfonic, and phosphoric acids and the corresponding anions), an amide, an alcohol, an amine, or an aldehyde. Exemplary surface crosslinkers include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and combinations comprising at least one of the foregoing.

Additional surface crosslinkers include borate, titanate, zirconate, aluminate, chromate, or a combination comprising at least one of the foregoing. Boron crosslinkers include boric acid, sodium tetraborate, encapsulated borates, and the like. Borate crosslinkers can be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Zirconium crosslinkers, e.g., zirconium lactates (e.g., sodium zirconium lactate), triethanolamines, 2,2'-iminodiethanol, or a combination comprising at least one of the foregoing can be used. Titanates crosslinkers can include, for example, lactates, triethanolamines, and the like.

The preformed synthetic polymer can include repeat units comprising an acrylate, an acrylamide, a vinylpyrrolidone, a vinyl ester (e.g., a vinyl acetate), a vinyl alcohol, a derivative thereof, or a combination comprising at least one of the foregoing. According to an embodiment, the preformed synthetic polymer can comprise polyacrylamide having crosslinks derived from polyethylene glycol diacrylate. In some embodiments, the superabsorbent polymer comprises polyacrylic acid, wherein the crosslinks are derived from a vinyl ester oligomer. In another embodiment, the superabsorbent polymer is a poly(acrylic acid) partial sodium salt-graft-poly(ethylene glycol), which is commercially available from Sigma Aldrich.

In addition to the preformed synthetic polymer, the polymer particles can further comprise a swellable natural polymer, e.g., a natural polysaccharide such as guar, carrageenan, starch, cellulose, xanthan gum, agar, pectin, alginic acid, tragacanth gum, pluran, gellan gum, tamarind seed gum, cardlan, gum arabic, glucomannan, chitin, chitosan, hyaluronic acid, and the like. The natural polysaccharides, when included in the particles, can aid in the hydration of the synthetic polymer. Alternatively, or in addition, the natural polymer can function as a friction reducer. Thus, the natural polymer can be included as a component of the cement spacer fluid, that is, added separately from the synthetic particles. The weight ratio of preformed synthetic polymer to natural polymer, e.g., guar gum or carrageen can be about 99:1 to about 80:20, for example about 97:3 to about 85:15, preferably about 95:5 to about 90:10.

In an embodiment, the natural polymer is a guar gum or carrageenan as disclosed, for example, in Japanese Patent Application No. P2003-154262A. The guar gum can be a natural guar gum or an enzyme treated guar gum obtained by treating natural guar gum with galactosidase, mannosidase, or another enzyme. The guar gum may further be a galactomannan derivative prepared by treating natural guar gum with chemicals to introduce carboxyl groups, hydroxyl alkyl groups, sulfate groups, phosphate groups, and the like. Carrageenan is an ionic linear polysaccharide that includes repeating galactose units that individually can be sulfated or unsulfated. Specific carrageenan types include kappa, iota, lambda, and the like. In some embodiments, a mixture of carrageenan types is used. In a specific embodiment, a carrageenan or a carrageenan-like material that forms a gel is used. In addition to natural carrageenan, suitable carrageenans include enzyme-treated substances of natural carrageenan or derivatized carrageenan, e.g., those prepared by treating natural carrageenan (e.g., with a chemical) to introduce a functional group (e.g., a carboxyl group, hydroxyl alkyl group, sulfate group, phosphate group, and the like).

The cement spacer fluid further comprises an aqueous carrier fluid to carry the preformed synthetic polymer to the desired location in the wellbore and to swell the polymer. The aqueous carrier fluid can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt %, based on the weight of the fluid.

The aqueous carrier fluid can be an aqueous mineral acid that includes hydrochloric acid, nitric acid, phosphoric acid, sulfuric acid, boric acid, hydrofluoric acid, hydrobromic acid, perchloric acid, or a combination comprising at least one of the foregoing. The fluid can be an aqueous organic acid that includes a carboxylic acid, sulfonic acid, or a combination comprising at least one of the foregoing. Exemplary carboxylic acids include formic acid, acetic acid, chloroacetic acid, dichloroacetic acid, trichloroacetic acid, trifluoroacetic acid, propionic acid, butyric acid, oxalic acid, benzoic acid, phthalic acid (including ortho-, meta- and para-isomers), and the like. Exemplary sulfonic acids include a $C_{1-20}$ alkyl sulfonic acid, wherein the alkyl group can be branched or unbranched and can be substituted or unsubstituted, or a $C_{3-20}$ aryl sulfonic acid wherein the aryl group can be monocyclic or polycyclic, and optionally comprises 1 to 3 heteroatoms (e.g., N, S, or P). Alkyl sulfonic acids can include, for example, methane sulfonic acid. Aryl sulfonic acids can include, for example, benzene sulfonic acid or toluene sulfonic acid. In some embodiments, the aryl group can be $C_{1-20}$ alkyl-substituted, i.e., is an alkylarylene group, or is attached to the sulfonic acid moiety via a $C_{1-20}$ alkylene group (i.e., an arylalkylene group), wherein the alkyl or alkylene can be substituted or unsubstituted.

The cement spacer fluid can further comprise other components known for use in cement spacer fluids, for example a viscosifier, a viscosifier crosslinker, a pH control agent, a surfactant, a weighting agent, a lubricant, a fluid loss agent, a clay stabilizer, a biocide, an acid, a corrosion inhibitor, friction reducer, oxygen scavenger, formation fines controller, foamer, and gel stabilizer. These additional components are selected so as to avoid imparting unfavorable characteristics to the cement spacer fluid, to avoid damage to equipment in contact with the cement spacer fluid, and to avoid damaging the wellbore or subterranean formation.

The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth) acrylic acid and (meth)acrylamide, and C1-8 alkyl poly (meth)acrylates; or clays such as bentonite, sepiolite, and attapulgite, and the like; or a combination comprising at least one of the foregoing viscosifiers.

The viscosifier forms a viscous gel upon, or due to, contact with the fluid of the cement spacer fluid (or other fluid such as water, brine, or other downhole fluid). In some embodiments, a combination of fluids is used to form the cement spacer fluid, a first fluid to swell the preformed synthetic polymer and a second fluid to gel the cement spacer fluid. Without being bound by theory, the presence of a viscosifier in the cement spacer fluid increases the viscosity, thus the particle-suspension ability of the composition, and reduces the friction pressure. When the cement spacer fluid is a fluid foam, the viscosifier can further stabilize the foam. Selection of the preformed synthetic polymer and the viscosities allow manufacture of cement spacer fluid having beneficial rheological properties including tunable viscosity and breaking properties.

In an embodiment, a crosslinker for the viscosifier can be present, for example a borate, titanate, zirconate, aluminate, or chromate crosslinker as described above, or a combination comprising at least one of the foregoing.

The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

In embodiments where two fluid spacers or pills are used sequentially, the first may be a weighted drive spacer that contains one or more weighting agents. Weighting agents are high-specific gravity and finely divided solid materials used to increase density, for example silica flour, fly ash, calcium carbonate, barite, hematite, ilemite, siderite, and the like.

Surfactants can increase the compatibility of the cement spacer fluid and the drilling fluid. The surfactant can be anionic, cationic, zwitterionic, or non-ionic. Other useful surfactants include those having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Exemplary cationic surfactants include $C_{1-18}$ alkyl or aryl, primary, secondary, or tertiary amines, alkanolamides, quaternary ammonium salts, alkylated imidazolium, and pyridinium salts. Additional examples of the cationic surfactant include primary to tertiary alkylamine salts such as monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy) methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include $C_{1-60}$ carboxylates, $C_{1-20}$ alkyl sulfates, $C_{1-20}$ alkyl sulfonates, fatty acids, sulfosuccinates, $C_{1-20}$ phosphonates, or mono- or di-($C_{1-20}$ alkyl) phosphate esters. Examples of an anionic surfactant include anionic surfactants having a carboxyl group such as a sodium, potassium, or ammonium salt of a ($C_{1-20}$ alkyl) carboxylic acid, a sodium, potassium, or ammonium salt of a ($C_{7-20}$ alkylbenzene)carboxylic acid, a sodium, potassium, or ammonium salt of a poly(oxy($C_{1-4}$ alkylene) ($C_{1-12}$alkyl) ether carboxylic acid, a sodium, potassium, or ammonium salt of salt of N-acylsarcosine acid, a sodium, potassium, or ammonium salt of N-acylglutamic acid, and the like.

Nonionic surfactants can be, for example, esters and polyesters of fatty acids of up to about 22 carbon atoms such as stearic acids, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like, ethoxylated fatty alcohols, alkyl phenol polyethoxylates, glycerol esters, glycol esters, polyethers, alkyl polyglycosides, amineoxides, or a combination comprising at least one of the foregoing. Specific examples of nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monodecyl ether, and the like); polyoxypropylene glycol alkyl ethers (e.g., butapropylene glycol mononyl ethers); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $(CH_3)_3N^+CH(R)COO^-$ or sulfonates (sulfo-betaines) such as $RN^+(CH_3)_2(CH_2)_3SO_3^-$, where R is an alkyl group. Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5)(CH_3)CH_2CH_2SO_3^-]$.

In an embodiment, the surfactant is a viscoelastic surfactant capable of forming viscoelastic fluids at a lower concentration. This specific rheological behavior is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle. Viscoelastic surfactants are usually ionic, including cationic, anionic, or zwitterionic. When the surfactant is cationic, it is associated with a negative counterion, which can be an inorganic anion such as a sulfate, a nitrate, a perchlorate or a halide such as $Cl^-$, $Br^-$, or with an aromatic organic anion such as salicylate, naphthalene sulfonate, p and m chlorobenzoates, 3,5-, 3,4-, and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, $Na^+$ or $K^+$. When it is zwitterionic, it is associated with both negative and positive counterions, for example, $Cl^-$ and $Na^+$ or $K^+$. Viscoelastic surfactant has been described in U.S. Pat. Nos. 7,081,439 and 7,279,446.

The cement spacer fluid can be a gel, a liquid, or a foam. The carrier fluid can be foamed with a liquid hydrocarbon or a gas or liquefied gas such as nitrogen or carbon dioxide. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include ($C_{1-20}$ alkyl) quaternary ammonium salts, ($C_{1-6}$ alkyl) benzyl quaternary ammonium salts and ($C_{1-20}$ alkyl) amido amine quaternary ammonium salts. A foam system is primarily used in fracturing low pressure or water sensitive formations.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine, cellulose derivatives, and polystyrene sulfonate. In some embodiments, the same polymer functions as both a viscosifier and a fluid-loss control agent.

The clay stabilizer prevents the clay downhole from swelling under contact with the cement spacer fluid or applied fracturing pressure and can be, for example, a quaternary amine, a brine (e.g., KCl brine), choline chloride, tetramethyl ammonium chloride, and the like.

A biocide prevents injection of a microbe (e.g., bacteria) downhole by eliminating or reducing bacteria in the cement spacer fluid, thus reducing production of, e.g., sour gas. Examples of biocides include aldehydes such as glutaraldehyde, oxidizing biocides such as hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like, stabilized sodium hypobromite, activated sodium bromide, brominated hydantoins, chlorine dioxide, ozone, inorganic persulfates such as ammonium persulfate, or peroxides, such as hydrogen peroxide, and organic peroxides, and non-oxidizing biocides such as dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, quaternary ammonium salts (e.g., having a fatty alkyl group and three methyl groups), and quaternary phosphonium salts having methyl groups, hydroxymethyl groups or aryl groups. Specific examples of biocides include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination comprising at least one of the foregoing can be used. In an embodiment, the biocide is encapsulated or coated.

The cement spacer fluid can be premixed or is injected without mixing, e.g., injected "on the fly" where the components are combined as the cement spacer fluid is being injected downhole. The order of addition can be varied and the time of injecting each is the same or different.

The various properties of the cement spacer fluids can be varied and can be adjusted according to well control and compatibility parameters of the particular drilling fluid and cement slurry with which it is associated. In an embodiment, the cement spacer fluid includes the preformed synthetic polymer in an amount of about 1 pound to about 200 pounds per thousand gallons of aqueous cement spacer carrier fluid, preferably about 10 pounds to about 100 pounds per thousand gallons per thousand gallons of aqueous cement spacer carrier fluid, more preferably about 30 pounds to about 60 pounds per thousand gallons per thousand gallons of aqueous cement spacer carrier fluid.

As stated above, without being bound by theory, the cement spacer fluids comprising the preformed synthetic polymer, and in particular the preformed synthetic polymer in form of particles utilizes a novel particle packing mode approach to create a cementing spacer system that does not follow the conventional rules within the art of cementing. Thus, it is not necessarily needed that the fluid has turbulent flow characteristics, especially if the concentration of the preformed synthetic polymer is high. In an embodiment, the preformed synthetic polymer is a primary component of the materials of the cement spacer fluid (other than the carrier). In this embodiment, the swelled particles form a hydrated particle pack in the spacer that removes drilling mud and particles such as drill cuttings from the annulus by itself, or in combination with other spacer and lost circulation systems ahead of the cement slurry.

On the other hand, the spacer can be formulation as a thin turbulent flow spacer system if the preformed synthetic polymer is present in low concentrations, essentially in the form of a minor additive to improve the performance of a conventional cement spacer. It can also be a primary ingredient in the creation of a SAP driven, particle pack method in which to deliver a cement spacer that removes drilling mud and particles such as drill cuttings from the annulus by its self, or in combination with other spacer and lost circulation systems ahead of the cement slurry.

In general, in the method of cementing a wellbore, the cement spacer fluid is used to displace the drilling fluids present, and preferably to further remove oil and solids from the well and wellbore surfaces. The method includes injecting, generally pumping, into the wellbore the cement spacer fluid at a pressure sufficient to displace the drilling fluid. One or more serially pumped cement spacer fluids or pills can be used. In a preferred embodiment, the drillings fluids are displaced together with solids such as drilling fluid solids and drill cuttings. A cement slurry is then injected into the wellbore (optionally with a "lead slurry" or a "tail slurry"). The cement slurry can be introduced between a penetrable/rupturable bottom plug and a solid top plug. Once placed, the cement slurry is allowed to harden to form the cement plug in the wellbore annulus, which prevents the flow of reservoir fluids between two or more permeable geologic formations that exist with unequal reservoir pressures. As is known by those of skill in the art, a high degree of variability exists in the above description of well cementation (e.g., multiple bottom plugs, graduated fluid densities, etc.), and can be effected using cement spacer fluid described herein.

The wellbore can be vertical, deviated or horizontal.

Use of the cement spacer fluids provides a number of benefits. The fluids are stable at high wellbore temperatures, for example up to about 350° F. In some embodiments, the fluids are stable at about 80 to about 350° F., or about 80 to about 250° F. The cement spacer fluids are compatible with both drilling fluid and the cement slurries that they are used in conjunction with. Additionally, the spacer fluids can more effectively remove drilling muds and contaminant particles from wellbores, for example drilling fluid particulates, drilling cuttings, and particles of reservoir rock sloughed into the drilled wellbore from weak formations, for example a shale particulate, mudstone particulate, sandstone particulate, carbonate particulate, and the like. The spacer fluids can further suppress mixing of drilling fluids and cement slurries when compared to turbulent flow spacer fluids.

The methods and compositions further have the advantages of improved cementing, by reducing the amount of drilling fluids, contaminant particles, and other debris before introducing the cement slurry. It will be appreciated that it is not necessary for all of the drilling fluids or all of the contaminant particulate to be removed for the method and its compositions to be considered successful. Success is obtained if more drilling fluids, particles and other contamination are removed using the cement spacer fluid than if it is not used. In general, of course, it is desirable to remove as much of the drilling fluids, contamination and debris as possible.

All ranges disclosed herein are inclusive of the endpoints, and the endpoints are independently combinable with each other. The ranges are continuous and thus contain every value and subset comprising at least one of the foregoing in the range. As used herein, "combination" is inclusive of blends, mixtures, alloys, reaction products, and the like. The term "(meth)acryl" is inclusive of both acryl and methacryl. As used herein, "a combination comprising at least one of the foregoing" refers to a combination comprising at least one of the named constituents, components, compounds, or elements, optionally with a like component, compound, or element not named. The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. Embodiments herein can be used independently or can be combined.

All references are incorporated herein by reference.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A method of cementing a wellbore comprising a drilling fluid, the method comprising
   injecting a cement spacer fluid into the wellbore to displace the drilling fluid;
   injecting a cement slurry into the wellbore subsequent to injecting the cement spacer fluid; and
   hardening the cement in the slurry to cement the wellbore,
   wherein the cement spacer fluid comprises:
   an aqueous cement spacer carrier fluid; and
   a preformed synthetic polymer swellable in the aqueous cement spacer carrier fluid in an amount effective to displace a drilling fluid during a cementing operation,
   wherein the preformed synthetic polymer comprises
   a copolymer of (meth)acrylamide with maleic anhydride, vinyl acetate, ethylene oxide, ethylene glycol, acrylonitrile, or a combination comprising at least one of the foregoing;
   poly(acrylamide) having crosslinks derived from polyethylene glycol diacrylate;
   poly(acrylic acid) having crosslinks derived from a vinyl ester oligomer;
   a poly(acrylic acid) partial sodium salt-graft-poly(ethylene glycol); or
   a copolymer of acrylic acid and a salt thereof having crosslinks derived from polyethylene glycol diacrylate; and
   the preformed synthetic polymer is present in the cement spacer fluid in a concentration of about 10 pounds to about 200 pounds per thousand gallons of aqueous cement spacer carrier fluid.

2. The method of claim 1, wherein displacing the drilling fluid further comprises displacing a contaminant particulate present in the wellbore.

3. The method of claim 2, wherein the contaminant particulate comprises a drilling fluid particulate, drilling cutting, a reservoir rock particulate, mudstone particulate, sandstone particulate, carbonate particulate, or a combination comprising at least one of the foregoing.

4. The method of claim 1, wherein the cement spacer fluid is a first cement spacer fluid, and the method further comprises injecting a second spacer fluid into the well bore after the first spacer fluid and before the cement slurry.

5. The method of claim 1, wherein the wellbore is a vertical or horizontal wellbore.

6. The method of claim 1, wherein the wellbore has a bottom hole temperature of about 80° F. to about 350° F.

7. The method of claim 1, wherein the carrier fluid comprises fresh water, salt water, aqueous acid, aqueous base, or a combination comprising at least one of the foregoing.

8. The method of claim 1, wherein the preformed synthetic polymer is stable up to about 350° F.

9. The method of claim 1, wherein the preformed synthetic polymer is present in the form of particles comprising the polymer.

10. The method of claim 1, wherein the particles are swelled and at least about 50% of the polymer particles have an average largest diameter of about 500 to about 12,000 micrometers.

11. The method of claim 1, wherein the preformed synthetic polymer is present in the cement spacer fluid in a concentration of about 10 pound to about 100 pounds per thousand gallons of aqueous cement spacer carrier fluid.

12. The method of claim 1, wherein the preformed synthetic polymer is present in the cement spacer fluid in a concentration of about 30 pound to about 60 pounds per thousand gallons of aqueous cement spacer carrier fluid.

13. The method of claim 1, further comprising guar, carrageenan, or a combination comprising at least one of the foregoing.

14. The method of claim 1, wherein the preformed synthetic polymer is present in the form of a hydrated pack of swelled polymer particles.

15. The method of claim 1, wherein the cement spacer fluid is a fluid foam.

16. The method of claim 1, wherein the cement spacer fluid further comprises a borate, titanate, zirconate, aluminate, chromate crosslinker, or a combination comprising at least one of the foregoing.

\* \* \* \* \*